US009598068B2

United States Patent
Maeda et al.

(10) Patent No.: US 9,598,068 B2
(45) Date of Patent: Mar. 21, 2017

(54) CONTROL SYSTEM FOR FOUR-WHEEL-DRIVE VEHICLE

(71) Applicant: Toyota Jidosha Kabushiki Kaisha, Toyota-shi, Aichi-ken (JP)

(72) Inventors: Yoshinori Maeda, Aichi-ken (JP); Kunihiro Iwatsuki, Toyota (JP); Hiroyuki Ishii, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 224 days.

(21) Appl. No.: 14/515,786

(22) Filed: Oct. 16, 2014

(65) Prior Publication Data

US 2015/0111696 A1 Apr. 23, 2015

(30) Foreign Application Priority Data

Oct. 22, 2013 (JP) ................. 2013-218912

(51) Int. Cl.
*B60K 17/354* (2006.01)
*B60K 23/08* (2006.01)
*B60W 10/119* (2012.01)
*B60K 23/04* (2006.01)

(52) U.S. Cl.
CPC ........... *B60W 10/119* (2013.01); *B60K 23/08* (2013.01); *B60K 2023/043* (2013.01); *B60K 2023/085* (2013.01); *Y10T 477/641* (2015.01)

(58) Field of Classification Search
CPC .... B60K 17/354; B60K 17/344; B60K 17/35; F16H 2048/205; F16H 48/26
USPC ................................. 180/245, 246
See application file for complete search history.

(56) References Cited

U.S. PATENT DOCUMENTS

| | | | | |
|---|---|---|---|---|
| 5,105,901 A | * | 4/1992 | Watanabe | .......... B60K 23/0808 180/245 |
| 6,962,227 B1 | * | 11/2005 | Kirkwood | ............ B60K 17/046 180/245 |
| 7,258,187 B2 | * | 8/2007 | Bowen | ................... B60K 17/16 180/245 |

(Continued)

FOREIGN PATENT DOCUMENTS

| | | |
|---|---|---|
| JP | 01-069032 U | 5/1989 |
| JP | 03-182840 A | 8/1991 |
| JP | 2011-079421 A | 4/2011 |

*Primary Examiner* — Anne Marie Boehler
(74) *Attorney, Agent, or Firm* — Dinsmore & Shohl LLP

(57) ABSTRACT

In a control system, a transfer is connected to a rotation member between a driving power source and primary driving wheels and distributes dynamic power of the driving power source to secondary drive wheels. A driving power transmission shaft transmits the dynamic power of the driving power source distributed by the transfer to the secondary drive wheels. A connection-disconnection mechanism is disposed between the rotation member and the driving power transmission shaft. First and second clutches are disposed respectively between the driving power transmission shaft and right and left wheels of the secondary drive wheels. The electronic control unit is configured, when switching from a two-wheel-drive running state to a four-wheel-drive running state on the basis of a vehicle running state, to generate a transmission torque in the first clutch or the second clutch after controlling the connection-disconnection mechanism to engage the connection-disconnection mechanism.

4 Claims, 5 Drawing Sheets

(56) References Cited

U.S. PATENT DOCUMENTS

| | | | |
|---|---|---|---|
| 7,383,910 B2* | 6/2008 | Mori | B60K 17/16 |
| | | | 180/245 |
| 8,313,407 B2 | 11/2012 | Ekonen et al. | |
| 9,358,884 B2* | 6/2016 | Stares | B60K 23/0808 |
| 2007/0029127 A1* | 2/2007 | Mori | B60K 17/344 |
| | | | 180/247 |
| 2008/0029328 A1* | 2/2008 | Hoeck | B60K 17/35 |
| | | | 180/248 |
| 2011/0082004 A1 | 4/2011 | Kato et al. | |
| 2014/0058643 A1* | 2/2014 | Kodama | G06F 17/00 |
| | | | 701/82 |
| 2015/0096814 A1* | 4/2015 | Maeda | B62D 11/003 |
| | | | 180/6.28 |
| 2015/0328982 A1* | 11/2015 | Takaira | B60K 23/08 |
| | | | 180/233 |
| 2015/0328983 A1* | 11/2015 | Takaira | B60K 17/35 |
| | | | 180/233 |
| 2016/0107523 A1* | 4/2016 | Maeda | B60K 17/354 |
| | | | 180/245 |
| 2016/0193917 A1* | 7/2016 | Horiike | B60K 17/3515 |
| | | | 701/54 |

* cited by examiner

000000000

CONTROL SYSTEM FOR FOUR-WHEEL-DRIVE VEHICLE

INCORPORATION BY REFERENCE

The disclosure of Japanese Patent Application No. 2013-218912 filed on Oct. 22, 2013 including the specification, drawings and abstract is incorporated herein by reference in its entirety.

BACKGROUND OF THE INVENTION

1. Field of the Invention

The present invention relates to a control system for switching a running state between a two-wheel-drive running state and a four-wheel-drive running state in a four-wheel-drive vehicle that includes a connection-disconnection mechanism disposed closer to a driving power source than a driving power transmission shaft and right and left clutches disposed in power transmission paths to right and left wheels as secondary drive wheels.

2. Description of Related Art

A four-wheel-drive vehicle is well known which includes a connection-disconnection mechanism disposed on a driving power source side of a driving power transmission shaft (for example, propeller shaft) that transmits dynamic power to secondary drive wheels, which serve as driven wheels at the time of two-wheel-drive running (2WD running), at the time of four-wheel-drive running (4WD running) and right and left clutches disposed in power transmission paths to the right and left wheels of the secondary drive wheels, respectively, so as to control a transmission torque. An example thereof is described in U.S. Pat. No. 8,313,407 B2. In the four-wheel-drive vehicle, by disengaging the connection-disconnection mechanism and the right and left clutches in a 2WD running state in which dynamic power is transmitted to only primary drive wheels for running, it is possible to stop rotation of rotation elements (such as the driving power transmission shaft) constituting a part of the power transmission paths between the connection-disconnection mechanism and the right and left clutches. In this case, it is possible to improve fuel efficiency compared with a case where only one of the connection-disconnection mechanism and the right and left clutches is disengaged in the 2WD running state.

SUMMARY OF THE INVENTION

U.S. Pat. No. 8,313,407 B2 describes that a running state is switched between a 2WD running state (hereinafter, referred to as 2WD_d running state) in which the connection-disconnection mechanism and the right and left clutches are disengaged and a 4WD running state in which the connection-disconnection mechanism and the right and left clutches are engaged, but does not describe a specific control routine at the time of switching from the 2WD_d running state to the 4WD running state. In the 2WD_d running state, three connection and disconnection units of the connection-disconnection mechanism and the right and left clutches are disengaged, and there is a possibility that the running state will not be rapidly switched to the 4WD running state depending on a control routine of engaging the three connection and disconnection units at the time of switching to the 4WD running state. The above-mentioned problems are not known and the specific control routine capable of rapidly switching the running state from the 2WD_d running state to the 4WD running state has not been proposed.

The invention provides a control system for a four-wheel-drive vehicle that can rapidly switch the running state to the 4WD running state at the time of switching from the 2WD_d running state to the 4WD running state.

According to an aspect of the invention, there is provided a control system for a four-wheel-drive vehicle. The four-wheel-drive vehicle includes a driving power source, primary drive wheels, secondary drive wheels, and a rotation member. The control system includes a transfer, a driving power transmission shaft, a connection-disconnection mechanism, a first clutch, a second clutch, and an electronic control unit. The transfer is connected to the rotation member constituting a part of a first power transmission path between the driving power source and the primary driving wheels. The transfer is configured to distribute dynamic power of the driving power source to the secondary drive wheels. The driving power transmission shaft is configured to transmit the dynamic power of the driving power source distributed by the transfer to the secondary drive wheels. The connection-disconnection mechanism is disposed in a second power transmission path between the rotation member and the driving power transmission shaft. The connection-disconnection mechanism is configured to cut off and establish the second power transmission path. The first clutch is disposed in a third power transmission path between the driving power transmission shaft and a left wheel of the secondary drive wheels. The first clutch is configured to change a transmission torque. The second clutch is disposed in a fourth power transmission path between the driving power transmission shaft and a right wheel of the secondary drive wheels. The second clutch is configured to change a transmission torque. The electronic control unit is configured to switch, on the basis of a vehicle running state, between a two-wheel-drive running state in which the connection-disconnection mechanism, the first clutch, and the second clutch are disengaged and a four-wheel-drive running state in which the connection-disconnection mechanism, the first clutch, and the second clutch are engaged. The electronic control unit is configured, when switching from the two-wheel-drive running state to the four-wheel-drive running state, to generate a transmission torque in the at least one of the first clutch or the second clutch after controlling the connection-disconnection mechanism to engage the connection-disconnection mechanism.

According to this configuration, it is possible to rapidly generate the transmission torque in the engaged clutch at the time of early engaging at least one of the first clutch or the second clutch. Accordingly, it is possible to rapidly set the 4WD running state at the time of switching from the 2WD_d running state to the 4WD running state.

In the control system, the electronic control unit may be configured, when switching from the two-wheel-drive running state to the four-wheel-drive running state, to generate the transmission torque in the at least one of the first clutch or the second clutch on the basis of the vehicle running state after controlling the connection-disconnection mechanism to engage the connection-disconnection mechanism. According to this configuration, it is possible to rapidly generate the transmission torque, which suitably corresponds to the vehicle running state, in the engaged clutch at the time of early engaging at least one of the first clutch or the second clutch. Accordingly, it is possible to rapidly set the 4WD running state depending on the vehicle running state at the time of switching from the 2WD_d running state to the 4WD running state.

In the control system, the connection-disconnection mechanism may be a frictional clutch or a dog clutch including a synchronization mechanism. According to this configuration, the rotation of the driving power transmission shaft is stopped in the 2WD_d running state. Accordingly, even when a certain rotation speed difference occurs between the rotation speed on the driving power transmission shaft side of the connection-disconnection mechanism and the rotation speed on the driving power source of the connection-disconnection mechanism at the time of controlling the connection-disconnection mechanism so as to be engaged, it is possible to appropriately engage the connection-disconnection mechanism.

In the control system, the electronic control unit may be configured, when switching from the two-wheel-drive running state to the four-wheel-drive running state and steering, to generate the transmission torque in both of the first clutch and the second clutch on the basis of the vehicle running state after controlling the connection-disconnection mechanism to engage the connection-disconnection mechanism. According to this configuration, suitable driving power is rapidly generated in the drive wheels. It is possible to rapidly generate a yaw moment using the driving power generated in the respective secondary drive wheels.

In the control system, the electronic control unit may be configured to determine whether a steering state is an understeering state or an oversteering state at the time of steering. The electronic control unit may be configured, when the steering state is the understeering state or the oversteering state, to generate the transmission torque in both of the first clutch and the second clutch on the basis of the vehicle running state after controlling the connection-disconnection mechanism to engage the connection-disconnection mechanism. According to this configuration, it is possible to rapidly generate a yaw moment for suppressing the generated understeering or oversteering using the driving power generated in the respective secondary drive wheels.

In the control system, the electronic control unit may be configured, when switching from the two-wheel-drive running state to the four-wheel-drive running state and at the time of non-steering, to generate the transmission torque in both of the first clutch and the second clutch on the basis of the vehicle running state after controlling the connection-disconnection mechanism to engage the connection-disconnection mechanism after controlling the first clutch and the second clutch to engage both of the first clutch and the second clutch. According to this configuration, since both clutches of the first clutch and the second clutch are first controlled so as to be engaged, the rotation speed of the driving power transmission shaft of which the rotation is stopped can be raised so that the rotation speed of the driving power transmission shaft side of the connection-disconnection mechanism increases toward the rotation speed of the driving power source side of the connection-disconnection mechanism, and the connection-disconnection mechanism can be engaged in a state where the differential rotation speed of the connection-disconnection mechanism is suppressed. After the connection-disconnection mechanism is engaged, suitable driving power is generated in the respective drive wheels.

In the control system, the transmission torque generated in at least one of the first clutch or the second clutch after the electronic control unit controls the connection-disconnection mechanism to engage the connection-disconnection mechanism may be a predetermined transmission torque based on a steering angle or a transmission torque for transmitting dynamic power of the driving power source to the secondary drive wheels so as to cause vehicle behavior to approximate a target vehicle turn based on the steering angle. According to this configuration, after the connection-disconnection mechanism is engaged, appropriate driving power is generated in the drive wheels even in a non-steered state in which the steering angle is substantially zero. Particularly, at the time of steering, it is possible to rapidly generate a yaw moment corresponding to the steering angle using the driving power generated in the secondary drive wheels.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In the present invention, preferably, a four-wheel-drive vehicle includes a transmission constituting a part of a power transmission path between a driving power source and primary drive wheels. As the transmission, a manual transmission such as a known synchronous mesh type parallel two-axis transmission in which plural pairs of transmission gears are disposed between two axles and various automatic transmissions (such as a planetary gear type automatic transmission, a synchronous mesh type parallel two-axis automatic transmission, a DCT, and a CVT can be used. The automatic transmission is constituted by a single automatic transmission, an automatic transmission having a hydraulic power transmission device, an automatic transmission having a secondary transmission, or the like. A transfer is connected to an output-side rotation member of the transmission so as to enable power transmission.

Preferably, the four-wheel-drive vehicle includes a second connection-disconnection mechanism that cuts off or sets up a power transmission path between a driving power transmission shaft and a clutch. A connection-disconnection mechanism disposed in the transfer and the second connection-disconnection mechanism is a disconnection mechanism that stops the rotation of a predetermined rotation element for transmitting dynamic power to the secondary drive wheels during the four-wheel-drive running by operation during the two-wheel-drive running. The predetermined rotation element corresponds to a rotation element interposed between the two disconnection mechanisms out of the rotation elements constituting the power transmission path between the driving power source and the secondary drive wheels. The state in which the predetermined rotation element is stopped by the operation of the disconnection mechanism is a disconnected state of the disconnection mechanism. When the second connection-disconnection mechanism is engaged but the connection-disconnection mechanism and the clutch are disengaged, the same state as the disconnected state can be achieved. That is, the clutch serves as one disconnection mechanism. Accordingly, the four-wheel-drive vehicle sets up the disconnected state during the 2WD running without including the second connection-disconnection mechanism.

Preferably, for example, a gasoline engine or a diesel engine such as an internal combustion engine that generates dynamic power by combustion of fuel can be used as the driving power source, and another motor such as an electric motor may be employed singly or in combination with an engine.

Hereinafter, embodiments of the invention will be described in detail with reference to the accompanying drawings.

Embodiment 1

Figure 1:
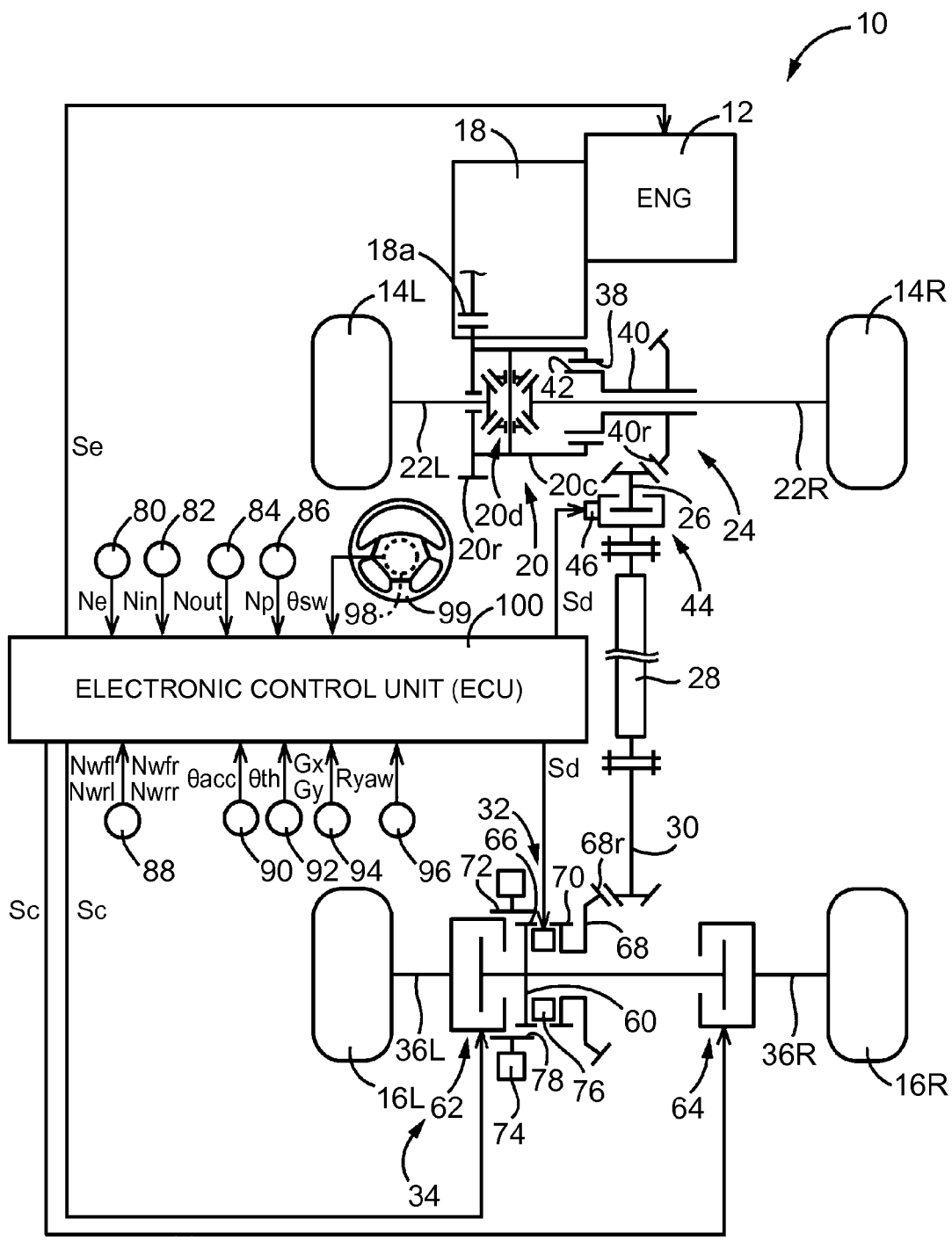
FIG. 1 is a skeletal diagram schematically illustrating a configuration of a four-wheel-drive vehicle to which the invention is applied and is a diagram illustrating a principal part of a control system in the vehicle.

FIG. 1 is a skeletal diagram schematically illustrating a configuration of a four-wheel-drive vehicle 10 (hereinafter, referred to as vehicle 10) to which the invention is applied and is a diagram illustrating a principal part of a control system in the vehicle 10. In FIG. 1, the vehicle 10 includes an engine 12, right and left front wheels 14R, 14L (hereinafter, referred to as front wheels 14 when both are not particularly distinguished), right and left rear wheels 16R, 16L (hereinafter, referred to as rear wheels 16 when both are not particularly distinguished), a first power transmission path which is a power transmission path between the engine 12 and the front wheels 14 and through which dynamic power of the engine 12 is transmitted to the front wheels 14, and a second power transmission path which is a power transmission path between the engine 12 and the rear wheels 16 and through which the dynamic power of the engine 12 is transmitted to the rear wheels 16.

The engine 12 is an internal combustion engine such as a gasoline engine or a diesel engine and is a driving power source that generates driving power. The front wheels 14 are primary drive wheels that serve as driving wheels in a two-wheel-drive running state (2WD running state) and a four-wheel-drive running state (4WD running state). The rear wheels 16 are secondary drive wheels that serve as driven wheels in the 2WD running state and to which dynamic power is transmitted from the engine 12 via the second power transmission path in the 4WD running state. Accordingly, the vehicle 10 is a FF-based four-wheel-drive vehicle.

The first power transmission path includes a transmission 18, a front differential 20, and right and left front-wheel axles 22R, 22L (hereinafter, referred to as front-wheel axles 22 when both are not particularly distinguished). The second power transmission path includes the transmission 18, a transfer 24 as a front/rear-wheel power distribution device that distributes the dynamic power of the engine 12 to the rear wheels 16, a driven pinion 26, a propeller shaft 28 as a driving power transmission shaft that transmits dynamic power of the engine 12 distributed by the transfer 24 to the rear wheels 16, a driving pinion 30, a rear-side clutch 32, a right/left driving power distribution device 34, and right and left rear-wheel axles 36R, 36L (hereinafter, referred to as rear-wheel axles 36 when both are not particularly distinguished).

The transmission 18 constitutes a part of a common power transmission path of the first power transmission path between the engine 12 and the front wheels 14 and the second power transmission path between the engine 12 and the rear wheels 16 and transmits dynamic power of the engine 12 to the front wheels 14 side or the rear wheels 16 side. Examples of the transmission 18 include a known planetary gear type multi-stage transmission in which plural transmission stages having different transmission gear ratios $\gamma$ (=transmission input rotation speed Nin/transmission output rotation speed Nout) are selectively set up, a known continuously-variable transmission in which the transmission gear ratio $\gamma$ continuously varies in a stepless manner, and a known synchronous mesh type parallel two-axis transmission.

The front differential 20 is a known differential gear that includes a case 20c and a differential mechanism 20d having an umbrella gear and that transmits a rotational force to the right and left front-wheel axles 22R, 22L while appropriately providing a differential rotation to the right and left front-wheel axles 22R, 22L. A ring gear 20r is formed in the case 20c, and the ring gear 20r meshes with an output gear 18a as an output rotation member of the transmission 18. Accordingly, dynamic power output from the transmission 18 is input to the ring gear 20r. Inner circumferential fitting teeth 38 that are fitted to outer circumferential fitting teeth 42 to be described later are formed in the case 20c.

The transfer 24 is disposed in parallel to the front differential 20 as the rotation member constituting a part of the first power transmission path and is connected to the front differential 20. The transfer 24 includes a first rotation member 40.

The first rotation member 40 has a substantially cylindrical shape and the front-wheel axle 22R passes through the inner circumference side. The outer circumferential fitting teeth 42 are formed on one side in the axial direction of the first rotation member 40. The first rotation member 40 rotates together with the case 20c of the front differential 20 by fitting the outer circumferential fitting teeth 42 to the inner circumferential fitting teeth 38. A ring gear 40r meshing with the driven pinion 26 so as to transmit dynamic power of the engine 12 to the rear wheels 16 side is formed on the other side in the axial direction of the first rotation member 40.

The driven pinion 26 meshing with the ring gear 40r is connected to the propeller shaft 28 via the front-side clutch 44 and the propeller shaft 28 is connected to the driving pinion 30.

The front-side clutch 44 is a frictional clutch that selectively connects and disconnects the driven pinion 26 and the propeller shaft 28. The frictional clutch is, for example, a multi-disc (or single-disc) wet (or dry) clutch and is switched between engagement and disengagement by a front-side actuator 46 hydraulically controllable or electrically (electromagnetically) controllable.

In a state where the front-side clutch 44 is disengaged, since the driven pinion 26 and the propeller shaft 28 are disconnected, dynamic power of the engine 12 is not transmitted to the rear wheels 16. On the other hand, when the front-side clutch 44 is engaged, the driven pinion 26 and the propeller shaft 28 are connected to each other. Accordingly, when the driven pinion 26 rotates along with the first rotation member 40, the propeller shaft 28 and the driving pinion 30 rotate together. In this way, the front-side clutch 44 is a connection-disconnection mechanism that is disposed on the engine 12 side of the propeller shaft 28 and that cuts off or sets up a power transmission path between the front differential 20 and the propeller shaft 28.

The right/left driving power distribution device 34 is disposed between the rear-side clutch 32 and the rear wheels 16 and is configured to transmit a torque between the rear-side clutch 32 and the rear wheels 16 and to change a driving power distribution of the right and left rear wheels 16R, 16L. The right/left driving power distribution device 34 includes an input gear 60, a first coupling 62 disposed on the rear wheel 16L side, and a second coupling 64 disposed on the rear wheel 16R side. The input gear 60 is a common input rotation member that transmits dynamic power of the engine 12 to the first coupling 62 and the second coupling 64. Clutch teeth 66 constituting a part of the rear-side clutch 32 are formed on the outer circumference of the input gear 60. The first coupling 62 is disposed between the input gear 60 and the rear wheel 16L and is, for example, a known electronically-control coupling constituted by a wet multi-disc clutch. By controlling a transmission torque (clutch torque) of the first coupling 62, the driving power to be transmitted to the rear wheel 16L is controlled. Specifically, when a current is supplied to an electromagnetic solenoid (not illustrated) that controls the transmission torque of the first coupling 62, the first coupling 62 is engaged with an engaging force proportional to the current value. As the transmission torque of the first coupling 62 increases, the driving power transmitted to the rear wheel 16L increases. The second coupling 64 is disposed between the input gear 60 and the rear wheel 16R and is, for example, a known electronically-control coupling constituted by a wet multi-disc clutch. By controlling a transmission torque of the second coupling 64, the driving power to be transmitted to the rear wheel 16R is controlled. Specifically, when a current is supplied to an electromagnetic solenoid (not illustrated) that controls the transmission torque of the second coupling 64, the second coupling 64 is engaged with an engaging force proportional to the current value. As the transmission torque of the second coupling 64 increases, the driving power transmitted to the rear wheel 16R increases. The right/left driving power distribution device 34 can continuously change the torque distribution to the right and left rear wheels 16R, 16L, for example, between 0:100 and 100:0 by controlling the transmission torque of the first coupling 62 and the transmission torque of the second coupling 64. The right/left driving power distribution device 34 can continuously change the torque distribution to the front wheels 14 and the rear wheels 16, for example, between 100:0 and 50:50 by controlling the transmission torque of the first coupling 62 and the transmission torque of the second coupling 64. In this way, the first coupling 62 and the second coupling 64 are a first clutch and a second clutch that are disposed in the power transmission paths between the propeller shaft 28 and the right and left rear wheels 16R, 16L, respectively, so as to control the transmission torques.

The vehicle 10 further includes a power transmission member 68 between the driving pinion 30 and the rear-side clutch 32. The power transmission member 68 has a substantially cylindrical shape and a shaft provided with the input gear 60 passes through on the inner circumference side thereof. A ring gear 68r meshing with the driving pinion 30 so as to receive the dynamic power of the engine 12 transmitted from the front wheels 14 side is formed on one side in the axial direction of the power transmission member 68. Clutch teeth 70 constituting a part of the rear-side clutch 32 are formed on the other side in the axial direction of the power transmission member 68.

The rear-side clutch 32 is a clutch that is disposed between the power transmission member 68 and the input gear 60 and that selectively cuts off or sets up a power transmission path therebetween. The rear-side clutch 32 is a dog clutch (that is, mesh type clutch) that includes the clutch teeth 66, the clutch teeth 70, a sleeve 72, a support member 74, and a rear-side actuator 76. The sleeve 72 has a substantially cylindrical shape and inner circumferential teeth 78 that can mesh with the clutch teeth 66 and the clutch teeth 70 are formed on the inner circumference side of the sleeve 72. The sleeve 72 is moved in the axial direction, for example, by the front-side actuator 76 that can be electrically (electormagnetically) controlled. The rear-side clutch 32 may be further provided with a synchronizer (synchronization mechanism).

FIG. 1 illustrates a state where the rear-side clutch 32 is disengaged. As illustrated in the drawing, in the state where the inner circumferential teeth 78 do not mesh with the clutch teeth 66 and the clutch teeth 70, since the power transmission member 68 and the input gear 60 are disconnected, the power transmission path between the driving pinion 30 and the right/left driving power distribution device 34 is cut off and the dynamic power of the engine 12 is not transmitted to the right/left driving power distribution device 34. On the other hand, when the sleeve 72 moves and both of the clutch teeth 66 and the clutch teeth 70 mesh with the inner circumferential teeth 78, the rear-side clutch 32 is engaged and the power transmission member 68 and the input gear 60 are connected to each other. Accordingly, when the dynamic power of the engine 12 is transmitted to the driving pinion 30, the dynamic power is transmitted to the right/left driving power distribution device 34. In this way, the rear-side clutch 32 is a second connection-disconnection mechanism that is disposed on the rear wheels 16 side of the propeller shaft 28 and that cuts off or sets up a power transmission path (particularly, a power transmission path between the propeller shaft 28 and the right/left driving power distribution device 34) between the engine 12 and the rear wheels 16.

In the vehicle 10 having the above-mentioned configuration, for example, when both of the front-side clutch 44 and the rear-side clutch 32 are engaged and the transmission torque of the first coupling 62 and/or the second coupling 64 is controlled to be a value greater than zero, the driving power corresponding to the transmission torque of the first coupling 62 and/or the second coupling 64 is transmitted to the rear wheels 16. Accordingly, dynamic power is transmitted to all of the front wheels 14 and the rear wheels 16 and the running state is switched to the 4WD running state. In the 4WD running state, the torque distribution to the front wheels 14 and the rear wheels 16 and the torque distribution to the right and left rear wheels 16R, 16L are adjusted if necessary by controlling the transmission torque of the first coupling 62 and/or the second coupling 64.

In the vehicle 10, for example, when the front-side clutch 44 is disengaged, the driven pinion 26 and the propeller shaft 28 are disconnected from each other and thus dynamic power is not transmitted to the rear wheels 16. Accordingly, the running state is switched to the 2WD running state in which only the front wheels 14 are driven. For example, when the rear-side clutch 32 is disengaged, the power transmission member 68 and the right/left driving power distribution device 34 are disconnected from each other and thus rotation is not transmitted from any of the engine 12 side and the rear wheels 16 to the rotation elements (the propeller shaft 28, the driven pinion 30, the power transmission member 68, and the like) constituting the power transmission path from the propeller shaft 28 to the power transmission member 68 in the 2WD running state. Accordingly, in the 2WD running state, the rotations of the rotation elements are stopped and the simultaneous rotation of the rotation elements is prevented, and thus the running resistance is reduced. The front-side clutch 44 and the rear-side clutch 32 are disconnection mechanisms that are disengaged during the 2WD running to stop the rotation of a predetermined rotation element for transmitting dynamic power to the rear wheels 16 during the 4WD running. The predetermined rotation element is a rotation member (that is, rotation elements constituting the power transmission path from the propeller shaft 28 to the power transmission member 68) interposed between the front-side clutch 44 and the rear-side clutch 32 out of the rotation elements constituting the power transmission path between the engine 12 and the rear wheels 16. The running state (that is, the 2WD running state in which the simultaneous rotation is prevented) in which the front-side clutch 44 and the rear-side clutch 32 are disengaged and the rotations of the rotation elements are stopped is a disconnected state in which the rotation of the predetermined rotation element is stopped. The 2WD running in this disconnected state is referred to as 2WD_d running. In the 2WD_d running, both of the first coupling 62 and the second coupling 64 are disengaged. When the rear-side clutch 32 is engaged but the front-side clutch 44, the first coupling 62, and the second coupling 64 are disengaged, the same state as the disconnected state is achieved.

In the vehicle 10, when the front-side clutch 44 and the rear-side clutch 32 are engaged and both of the first coupling 62 and the second coupling 64 are disconnected from each other, the input gear 60 and the rear wheels 16 are disconnected from each other and thus dynamic power is not transmitted to the rear wheels 16. Accordingly, the 2WD running state in which only the front wheels 14 are driven is achieved. In the 2WD running state, since the front-side clutch 44 and the rear-side clutch 32 are connected, the rotation elements (the propeller shaft 28, the driving pinion 30, the power transmission member 68, the input gear 60, and the like) constituting the power transmission path from the propeller shaft 28 to the input gear 60 rotate together. Accordingly, as the propeller shaft 28 and the like rotate together in the 2WD running state, fuel efficiency decreases. However, at the time of switching the 2WD running state to the 4WD running state, the first coupling 62 and/or the second coupling 64 only have to be engaged and it is thus possible to achieve rapid switching.

The vehicle 10 is switched between the 2WD running state (including the 2WD_d running state) and the 4WD running state by controlling the engaged/disengaged states of the front-side clutch 44 and the rear-side clutch 32 or the transmission torques of the first coupling 62 and/or the second coupling 64 depending on the vehicle running state.

The vehicle 10 is provided with an electronic control unit (ECU) 100 including a controller of the vehicle 10 that controls the transmission torques of the first coupling 62 and the second coupling 64. The electronic control unit 100 includes a so-called microcomputer having, for example, a CPU, a RAM, a ROM, and an input and output interface. The CPU performs various controls of the vehicle 10 by performing signal processes in accordance with a program stored in advance in the ROM while utilizing a temporary storage function of the RAM. For example, the electronic control unit 100 is configured to perform an output control of the engine 12, a driving state switching control of the vehicle 10, and the like and is divided into a part for the engine control, a part for the driving state control, and the like if necessary. As illustrated in FIG. 1, the electronic control unit 100 is supplied with various actual values (such as an engine rotation speed Ne, a transmission input rotation speed Nin, a transmission output rotation speed Nout, a propeller shaft rotation speed Np, vehicle wheel speeds Nwfl, Nwfr, Nwrl, and Nwrr corresponding to rotation speeds (vehicle wheel speeds) Nw of vehicle wheels (that is, front wheels 14R, 14L and rear wheels 16R, 16L), an accelerator opening θacc, a throttle valve opening 8th, a longitudinal acceleration Gx of the vehicle 10, a transverse acceleration Gy of the vehicle 10, a yaw rate Ryaw as the rotational angular velocity of the vehicle 10 about a vertical axis, and a steering angle θsw and a steering direction of a steering wheel 99) based on detection signals of various sensors (such as various rotation speed sensors 80, 82, 84, 86, and 88, an accelerator opening sensor 90, a throttle valve opening sensor 92, a G sensor 94, a yaw rate sensor 96, and a steering sensor 98). As illustrated in FIG. 1, the electronic control unit 100 outputs, for example, an engine output control command signal Se for the output control of the engine 12, an operation command signal Sd for switching the states of the front-side clutch 44 and the rear-side clutch 32, a torque command signal Sc for controlling the clutch torque of the first coupling 62 or the second coupling 64, and the like to a fuel injection unit, an ignition unit, an engine controller such as a throttle actuator, the front-side actuator 46, the rear-side actuator 76, actuators for driving the first coupling 62 or the second coupling 64, and the like. The electronic control unit 100 calculates a speed V of the vehicle 10 (hereinafter, referred to as vehicle speed V) as one of various actual values on the basis of the vehicle wheel speeds Nw. The electronic control unit 100 sets, for example, the average vehicle wheel speed of the vehicle wheel speeds Nw as the vehicle speed V.

Figure 2:
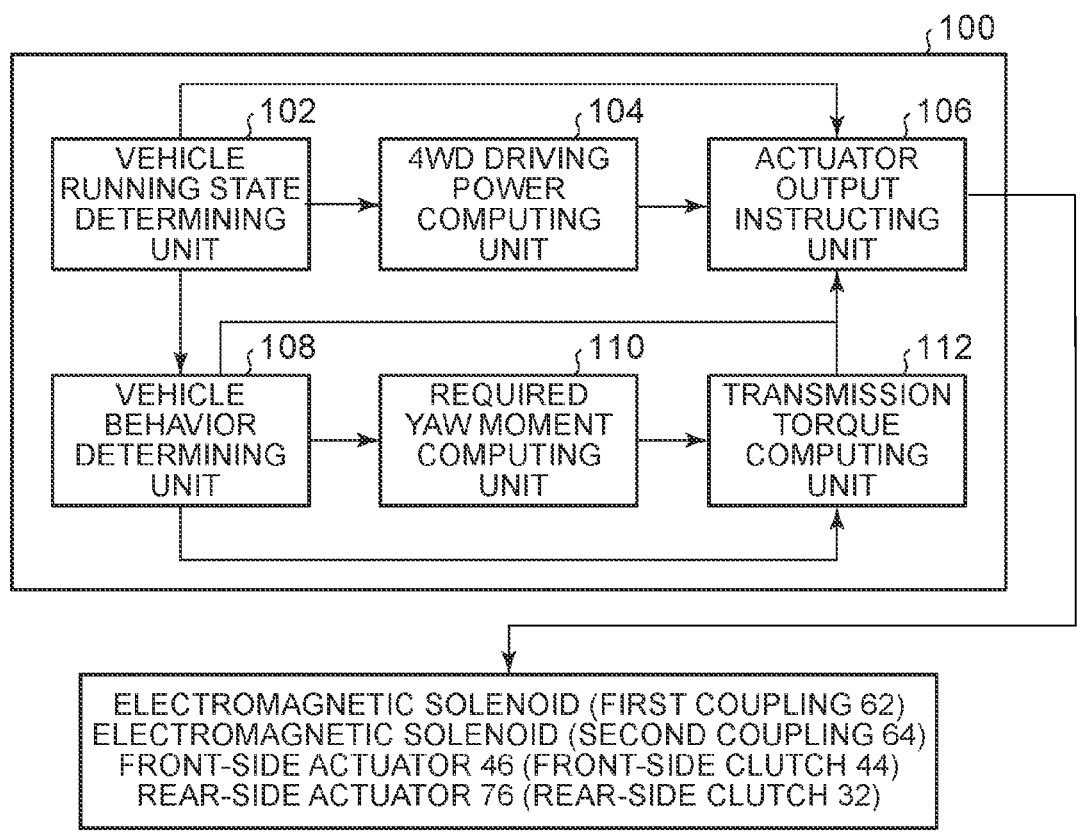
FIG. 2 is a functional block diagram illustrating a principal part of a control function of an electronic control unit.

FIG. 2 is a functional block diagram illustrating principal parts of the control function of the electronic control unit 100. In FIG. 2, the electronic control unit 100 includes vehicle running state determining means, that is, a vehicle running state determining unit 102, 4WD driving power computing means, that is, a 4WD driving power computing unit 104, and actuator output instructing means, that is, an actuator output instructing unit 106.

The vehicle running state determining unit 102 determines an optimal driving state (running state) of the vehicle 10 on the basis of information such as various signals. Specifically, when it is determined that the running state of the vehicle is in a normal running state in which the variation in the driving power of the vehicle 10 is less than a driving power variation threshold value which is calculated in advance by experiment or design and stored (that is, predetermined) on the basis of the accelerator opening θacc and the vehicle speed V, the vehicle running state determining unit 102 determines that the running state of the vehicle 10 is set to the 2WD_d running in which the vehicle runs with the front-side clutch 44, the rear-side clutch 32, the first coupling 62, and the second coupling 64 disengaged. On the other hand, when it is determined that the variation in the driving power is greater than the driving power variation threshold value, the vehicle running state determining unit 102 determines that the running state of the vehicle 10 is set to the 4WD running state in which the vehicle runs with the front-side clutch 44 and the rear-side clutch 32 engaged and with the first coupling 62 and the second coupling 64 engaged or slip-engaged. The vehicle running state determining unit 102 determines whether the vehicle 10 is turning on the basis of whether the absolute values of the steering angle θsw, the transverse acceleration Gy, and the yaw rate Ryaw are equal to or greater than turn determination threshold values θswth, Gyth, and Ryawth, and determines that the running state of the vehicle 10 is set to the 2WD_d running when it is determined that the vehicle 10 is not turning. When it is determined that a road surface is a low-μ road such as a snowy road on the basis of the vehicle wheel speeds Nw, information from a navigation system (not illustrated), and the like, the vehicle running state determining unit 102 determines that the running state of the vehicle 10 is set to the 4WD running state. When it is determined that any of the rotation speed differences among the vehicle wheels is greater than a predetermined rotation difference on the basis of the vehicle wheel speeds Nw, the vehicle running state determining unit 102 determines that the running state of the vehicle 10 is set to the 4WD running state. The turn determination threshold values θswth, Gyth, and Ryawth are, for example, predetermined determination values for determining whether the vehicle 10 is turning. For example, the turn determination threshold values θswth, Gyth, and Ryawth may be determined in advance to be constant values or may be determined in advance to be values varying depending on the vehicle speed V or the like. The predetermined rotation difference is, for example, a predetermined 4WD determination threshold value for determining whether the driving state of the vehicle 10 is set to the 4WD running state. The predetermined rotation difference may be determined in advance to be the same value between the vehicle wheels or may be determined in advance to be different values between the vehicle wheels. For example, when a known 2WD/4WD switching button which is operated by a driver is provided in the vehicle 10, the vehicle running state determining unit 102 may determine whether the running state of the vehicle is set to the 2WD running state or the 4WD running state, for example, on the basis of the operating state of the 2WD/4WD switching button.

The 4WD driving power computing unit 104 calculates an optimal front/rear-wheel driving power distribution on the basis of information such as various signals. Specifically, the 4WD driving power computing unit 104 calculates an estimated value (estimated engine torque) Tep of the engine torque Te on the basis of the engine rotation speed Ne, the throttle valve opening θth, and the like and calculates the front/rear-wheel driving power distribution so as to secure maximum acceleration performance. When it is determined that the operating state by the driver or the variation of the driving power of the vehicle 10 is stabilized on the basis of the throttle valve opening θth, the vehicle speed V, and the vehicle wheel speeds Nw, and the like, the 4WD driving power computing unit 104 decreases the driving power distribution to the rear wheels 16 to achieve a state close to the front-wheel-drive state, thereby improving fuel efficiency. In order to prevent a tight braking phenomenon at the time of turning at a low speed, the 4WD driving power computing unit 104 decreases the driving power distribution to the rear wheels 16. When it is determined by the vehicle running state determining unit 102 that the running state of the vehicle is set to the 2WD_d running state, the 4WD driving power computing unit 104 sets the driving power distribution to the rear wheels 16 to zero.

In order to achieve the running state determined by the vehicle running state determining unit 102 and the front/rear-wheel driving power distribution calculated by the 4WD driving power computing unit 104, the actuator output instructing unit 106 outputs various command signals to the front-side actuator 46 that switches the engaged and disengaged states of the front-side clutch 44, the rear-side actuator 76 that switches the engaged and disengaged states of the rear-side clutches 32, an electromagnetic solenoid (not illustrated) that controls the transmission torque of the first coupling 62, and an electromagnetic solenoid (not illustrated) that controls the transmission torque of the second coupling 64. Specifically, when it is determined by the vehicle running state determining unit 102 that the running state of the vehicle is set to the 2WD_d running state, the actuator output instructing unit 106 outputs commands for disengaging the front-side clutch 44 and the rear-side clutch 32 and setting the transmission torques of the first coupling 62 and the second coupling 64 to zero to the front-side actuator 46, the rear-side actuator 76, and the electromagnetic solenoids. When it is determined by the vehicle running state determining unit 102 that the running state of the vehicle is set to the 4WD running state, the actuator output instructing unit 106 outputs commands for engaging the front-side clutch 44 and the rear-side clutch 32 and controlling the transmission torques of the first coupling 62 and the second coupling 64 to the front-side actuator 46, the rear-side actuator 76, and the electromagnetic solenoids so as to achieve the 4WD running with the front/rear-wheel driving power distribution calculated by the 4WD driving power computing unit 104.

Particularly, at the time of switching from the 2WD_d running state to the 4WD running state, first, the actuator output instructing unit 106 outputs a command for engaging the rear-side clutch 32 to the rear-side actuator 76. This is to engage the rear-side clutch 32 in a state where the rotations of the power transmission member 68 and the input gear 60 are stopped, that is, in a state where the rotation speed of the power transmission member 68 and the rotation speed of the input gear 60 are substantially synchronized with each other. Thereafter, the actuator output instructing unit 106 outputs the commands for substantially simultaneously generating the transmission torques in the first coupling 62 and the second coupling 64 to the electromagnetic solenoids, respectively, and controls both couplings of the first coupling 62 and the second coupling 64 so as to engage both couplings. This is to raise the rotation speed of the propeller shaft 28 of which the rotation is stopped so as to achieve synchronization of the rotation speed of the driven pinion 26 and the rotation speed Np of the propeller shaft 28 with each other so as to engage the front-side clutch 44. After it is determined by the vehicle running state determining unit 102 that the rotation speed of the driven pinion 26 and the rotation speed Np of the propeller shaft 28 are substantially synchronized with each other, the actuator output instructing unit 106 outputs a command for engaging the front-side clutch 44 to the front-side actuator 46. Thereafter, the actuator output instructing unit 106 outputs commands for generating the transmission torques in the first coupling 62 and the second coupling 64 to the electromagnetic solenoids, respectively, so as to achieve the front/rear-wheel driving power distribution calculated by the 4WD driving power computing unit 104. The vehicle running state determining unit 102 determines whether the rotation speed of the driven pinion 26 and the rotation speed Np of the propeller shaft 28 are substantially synchronized with each other, for example, on the basis of whether the absolute value of the rotation speed difference between the rotation speed of the driven pinion 26 and the rotation speed Np of the propeller shaft 28 is equal to or less than a synchronization determination threshold value ΔNfcth. The rotation speed of the driven pinion 26 may be a rotation speed directly detected by a rotation speed sensor (not illustrated) or may be a rotation speed into which the corresponding transmission output rotation speed Nout is converted. The synchronization determination threshold value ΔNfcth is determined in advance, for example, in consideration of degradation in durability of the front-side clutch 44 due to the large rotation speed difference. The above-mentioned series of control routine for switching the 2WD_d running state to the 4WD running state is a normal 4WD switching control routine.

At the time of switching from the 2WD_d running state to the 4WD running state, it is preferable that the drive wheels 14, 16 in the 4WD running state be rapidly switched to a driving state corresponding to the vehicle running state. Particularly, when the steering wheel 99 is operated, it is preferable that the driving power capable of realizing a desired turn be rapidly generated. In the normal 4WD switching control routine, first, the transmission torque is substantially simultaneously generated in the first coupling 62 and the second coupling 64, but this is done to engage the front-side clutch 44 in the substantially-synchronized state but is not done to set the front/rear-wheel driving power distribution calculated by the 4WD driving power computing unit 104. Therefore, there is an advantage in that the front-side clutch 44 can be engaged in the substantially-synchronized state, but there is a possibility that generation of desired driving power will be delayed.

Therefore, at the time of switching from the 2WD_d running state to the 4WD running state, the electronic control unit 100 first engages the rear-side clutch 32, does not raise the propeller shaft rotation speed Np through the engagement of both of the first coupling 62 and the second coupling 64 (that is, does not decrease the differential rotation speed of the front-side clutch 44), then controls the front-side clutch 44 so as to be engaged, and then generates the transmission torques in both couplings of the first coupling 62 and the second coupling 64 on the basis of the vehicle running state. The front-side clutch 44 in this embodiment is a frictional clutch and can be engaged without setting the substantially-synchronized state, unlike a dog clutch not including a synchronization mechanism. Therefore, in the vehicle 10 according to this embodiment including the front-side clutch 44, it is possible to control the front-side clutch 44 so as to be engaged without raising the propeller shaft rotation speed Np by the engagement of the first coupling 62 and the second coupling 64.

As described above, at the time of steering, it is preferable that the driving power capable of realizing a turn corresponding to the steering be rapidly generated. That is, it is preferable that a yaw moment be rapidly generated using the driving power generated in the rear wheels 16. Therefore, the electronic control unit 100 performs the normal 4WD switching control routine when the steering is not performed at the time of switching from the 2WD_d running state to the 4WD running state. On the other hand, when the steering is not performed at the time of switching from the 2WD_d running state to the 4WD running state, the electronic control unit 100 controls the front-side clutch 44 so as to be engaged after engaging the rear-side clutch 32, and then generates the transmission torque in both couplings of the first coupling 62 and the second coupling 64 on the basis of the vehicle running state. More preferably, in order to rapidly generate the yaw moment for suppressing the generated understeering or oversteering, the electronic control unit 100 determines whether the steering state is the understeering state or the oversteering state at the time of steering, and controls the front-side clutch 44 so as to be engaged and then generates the transmission torque in both couplings of the first coupling 62 and the second coupling 64 on the basis of the vehicle running state when it is determined that the steering state is the understeering or oversteering state. The transmission torques generated in both couplings 62, 64 after the front-side clutch 44 is controlled so as to be engaged are transmission torques for transmitting the dynamic power of the engine 12 to the rear wheels 16 so as to cause the vehicle behavior to approximate a target vehicle turn based on the steering angle θsw. Accordingly, it is possible to rapidly generate the yaw moment corresponding to the steering angle θsw using the driving power generated in the rear wheels 16R, 16L. When the steering is not performed, the transmission torques are generated in both couplings 62, 64 so as to achieve the front/rear-wheel driving power distribution calculated by the 4WD driving power computing unit 104 in accordance with the normal 4WD switching control routine, but the transmission torques may be considered to be transmission torques based on the steering angle θsw substantially close to zero. Accordingly, after the front-side clutch 44 is engaged, appropriate driving power is generated in the drive wheels 14, 16 even in the non-steered state in which the steering angle θsw is substantially zero.

More specifically, the electronic control unit 100 further includes vehicle behavior determining means, that is, a vehicle behavior determining unit 108, required yaw moment computing means, that is, a required yaw moment computing unit 110, and transmission torque computing means, that is, a transmission torque computing unit 112.

The vehicle running state determining unit 102 determines, for example, whether the vehicle 10 of which steering wheel 99 is operated is steered. Specifically, the vehicle running state determining unit 102 determines whether the vehicle 10 is steered on the basis of the determination result of whether the absolute value of the steering angle θsw is equal to or greater than a predetermined steering angle θswth2. The predetermined steering angle δswth2 is, for example, a predetermined steering determination threshold value for determining whether the driver operates the steering wheel 99 so as to turn the vehicle 10. For example, the predetermined steering angle δswth2 may be determined in advance to be a constant value or may be determined in advance to be a value that varies depending on the vehicle speed V. The predetermined steering angle δswth2 may have the same value as the turn determination threshold value θswth.

For example, when it is determined by the vehicle running state determining unit 102 that the vehicle 10 is steered, the vehicle behavior determining unit 108 determines which of the understeering state and the oversteering state the vehicle is in. Specifically, the vehicle behavior determining unit 108 calculates a target yaw rate Ryawtgt on the basis of the vehicle speed V, a target stability factor Khtgt, a wheelbase L, a steering angle θsw, and a steering gear ratio nsw using a predetermined operational expression like Expression (1). On the basis of the actual yaw rate Ryaw when the target yaw rate Ryawtgt is equal to or greater than zero (Ryawtgt≥0), the vehicle behavior determining unit 108 determines that the vehicle is in the understeering state when Expression (2) is established, and determines that the vehicle is in the oversteering state when Expression (3) is established. On the other hand, on the basis of the actual yaw rate Ryaw when the target yaw rate Ryawtgt is less than zero (Ryawtgt<0), the vehicle behavior determining unit 108 determines that the vehicle behaves in the oversteering state when Expression (2) is established, and determines that the vehicle is in the understeering state when Expression (3) is established.

The target stability factor Khtgt is, for example, a target value of turnability of the vehicle 10 corresponding to the vehicle speed V and is a suitable value predetermined for each vehicle 10. The term (θsw/nsw) in Expression (1) represents the value of a turning angle of the vehicle wheel (tire turning angle).

$$Ryawtgt = V/((1+Khtgt \times V^2) \times L) \times (\theta sw/nsw) \quad (1)$$

$$Ryawtgt - Ryaw \geq 0 \quad (2)$$

$$Ryawtgt - Ryaw < 0 \quad (3)$$

When it is determined by the vehicle behavior determining unit 108 that the vehicle is in either of the understeering state or the oversteering state, the required yaw moment computing unit 110 calculates a yaw moment (required yaw moment) Mreq required for the target yaw rate Ryawtgt. Specifically, the required yaw moment computing unit 110 calculates the required yaw moment Mreq which is a feedback control quantity for matching the actual yaw rate Ryaw with the target yaw rate Ryawtgt, for example, using a predetermined feedback control expression like Expression (4). In Expression (4), ΔRyaw represents a yaw rate deviation (=Ryawtgt-Ryaw) between the target yaw rate Ryawtgt and the actual yaw rate Ryaw, Kp represents a predetermined proportional coefficient, Kd represents a predetermined differential coefficient, and Ki represents a predetermined integral coefficient.

$$Mreq = Kp \times \Delta Ryaw + Kd \times (d\Delta Ryaw/dt) + Ki \times (\int \Delta Ryaw \, dt) \quad (4)$$

When it is determined by the vehicle behavior determining unit 108 that the vehicle is in either of the understeering state or the oversteering state, the transmission torque computing unit 112 calculates the transmission torque (left clutch torque) Tcl of the first coupling 62 and the transmission torque (right clutch torque) Tcr of the second coupling 64, which are necessary for acquiring the required yaw moment Mreq with the optimal front/rear-wheel driving power distribution. Specifically, predetermined operational expressions like Expressions (8) and (9) for calculating the driving power (left-rear wheel driving power) Frl of the left rear wheel 16L and the driving power (right-rear wheel driving power) Frr of the right rear wheel 16R, which are necessary for acquiring the required yaw moment Mreq with the optimal front/rear-wheel driving power distribution, are derived from predetermined simultaneous equations like Expressions (5) to (7). The transmission torque computing unit 112 calculates a left clutch torque Tcl and a right clutch torque Tcr on the basis of total vehicle driving power Fall, a dynamic front-wheel grounding load sharing ratio i, a tire dynamic load radius rt, the required yaw moment Mreq computed by the required yaw moment computing unit 110, and a tread width (the length between the center in the tire width direction of the left-rear wheel 16L and the center in the tire width direction of the right-rear wheel 16R) Tr of the vehicle 10 using predetermined operational expressions like Expressions (10) and (11) derived from the operational expressions like Expressions (8) and (9). In Expressions (5) to (7), Ff represents the total driving power of the front wheels 14R, 14L. The transmission torque computing unit 112 computes the total vehicle driving power Fall on the basis of the estimated engine torque Tep computed by the 4WD driving power computing unit 104, the total gear ratio itotal in the power transmission path from the engine 14 to the drive wheels, and the tire dynamic load radius rt, for example, using a predetermined operational expression like Expression (12). The transmission torque computing unit 112 computes the dynamic front-wheel grounding load sharing ratio i on the basis of a static front-wheel grounding load Fnf, a static rear-wheel grounding load Fnr, a gravitational center height h of the vehicle 10, the wheelbase L, and the longitudinal acceleration Gx using a predetermined operational expression like Expression (13).

$$Ff + Frl + Frr = Fall \quad (5)$$

$$(Frl - Frr) \times (Tr/2) = Mreq \quad (6)$$

$$Ff : (Frl + Frr) = i : (1-i) \quad (7)$$

$$Frl = Fall \times (1-i)/2 + Mreq/Tr \quad (8)$$

$$Frr = Fall \times (1-i)/2 - Mreq/Tr \quad (9)$$

$$Tcl = Frl \times rt = Fall \times (1-i) \times rt/2 + Mreq/Tr \times rt \quad (10)$$

$$Tcr = Frr \times rt = Fall \times (1-i) \times rt/2 - Mreq/Tr \times rt \quad (11)$$

$$Fall = (Tep \times itotal)/rt \quad (12)$$

$$i = (Fnf - (h/L) \times Gx)/(Fnf + Fnr) \quad (13)$$

When it is determined by the vehicle running state determining unit 102 that the running state is set to the 4WD running state, it is determined by the vehicle running state determining unit 102 that the vehicle 10 is steered, and it is determined by the vehicle behavior determining unit 108 that the vehicle is in either of the understeering state or the oversteering state, the actuator output instructing unit 106 outputs a command for engaging the rear-side clutch 32 to the rear-side actuator 76 and then outputs a command for engaging the front-side clutch 44 to the front-side actuator 46 instead of the above-mentioned normal 4WD switching control routine. Thereafter, the actuator output instructing unit 106 outputs a command for generating the transmission torque in the first coupling 62 and the second coupling 64 to the corresponding electromagnetic solenoids so as to achieve the left clutch torque Tcl and the right clutch torque Tcr calculated by the transmission torque computing unit 112, after it is determined by the vehicle running state determining unit 102 that the rotation speed of the input gear 60 and the rotation speed of the rear-wheel axle 36 are substantially synchronized with each other. That is, the actuator output instructing unit 106 controls the first coupling 62 and the second coupling 64 so as to be engaged to achieve 100% engagement which is an engaged state in which the transmission torque is generated by 100% of the right and left clutch torques (the left clutch torque Tcl and the right clutch torque Tcr) calculated by the transmission torque computing unit 112. The vehicle running state determining unit 102 determines whether the rotation speed of the input gear 60 and the rotation speed of the rear-wheel axle 36 are substantially synchronized with each other, for example, on the basis of the determination on whether the absolute value of the rotation speed difference between the rotation speed of the input gear 60 and the left-rear vehicle wheel speed Nwrl becomes equal to or less than the synchronization determination threshold value ΔNth and the absolute value of the rotation speed difference between the rotation speed of the input gear 60 and the right-rear vehicle wheel speed Nwrr becomes equal to or less than synchronization determination threshold value ΔNth. For example, the rotation speed of the input gear 60 may be a rotation speed directly detected by a rotation speed sensor (not illustrated) or may be a rotation speed into which the propeller shaft rotation speed Np or the like is converted.

The synchronization determination threshold value ΔNth is an upper limit value of a predetermined rotation speed difference in which thermal loads of the first coupling 62 and the second coupling 64 are in an allowable range and which is based on the rotation speed difference and the transmission torque. As the synchronization determination threshold value ΔNth, for example, the same value may be used for the first coupling 62 and the second coupling 64 or different values may be used.

Figure 3:
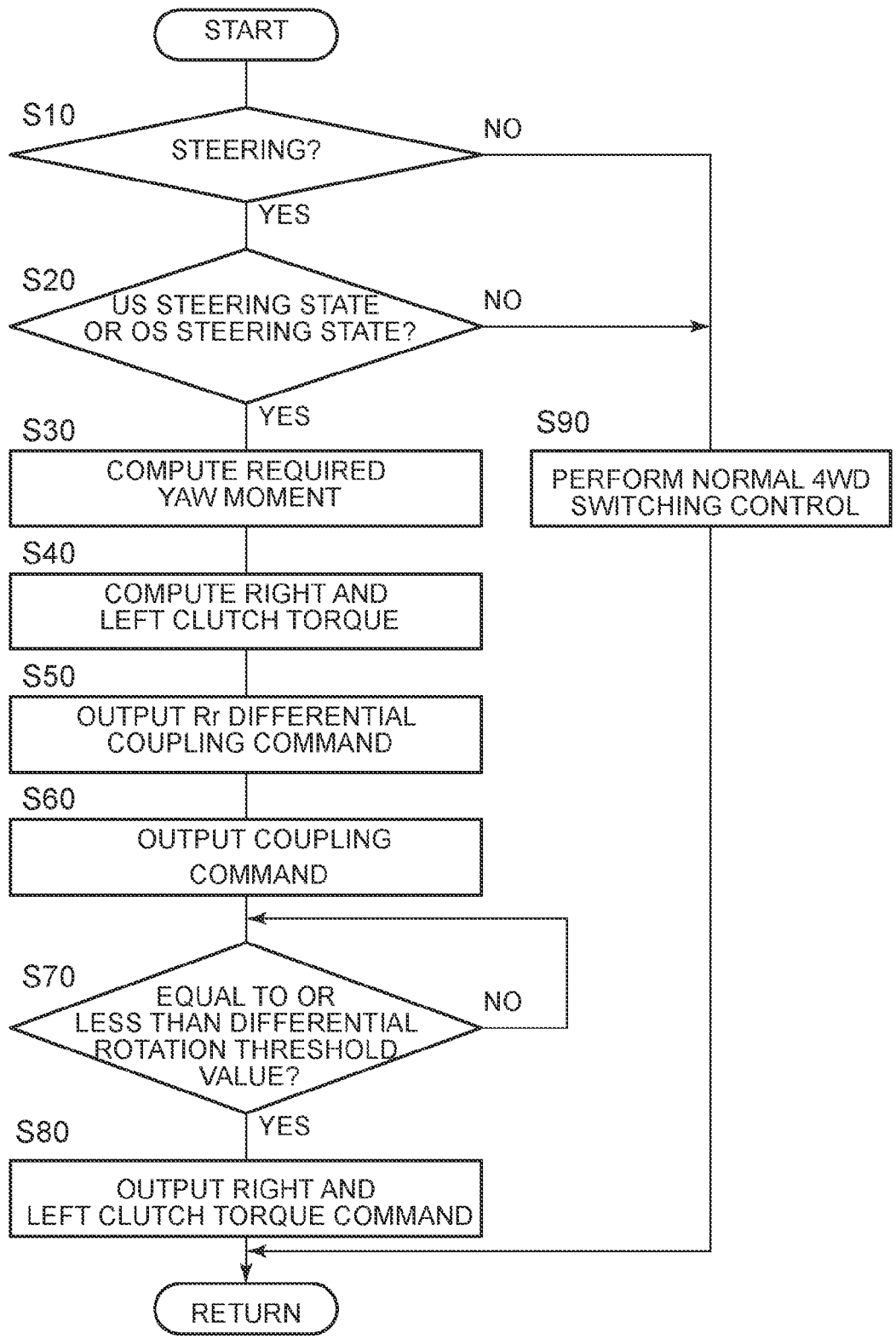
FIG. 3 is a flowchart illustrating a principal part of a control operation, that is, a control operation for rapidly switching a running state to a 4WD running state at the time of switching from a 2WD_d running state to the 4WD running state, of the electronic control unit.
Figure 4:
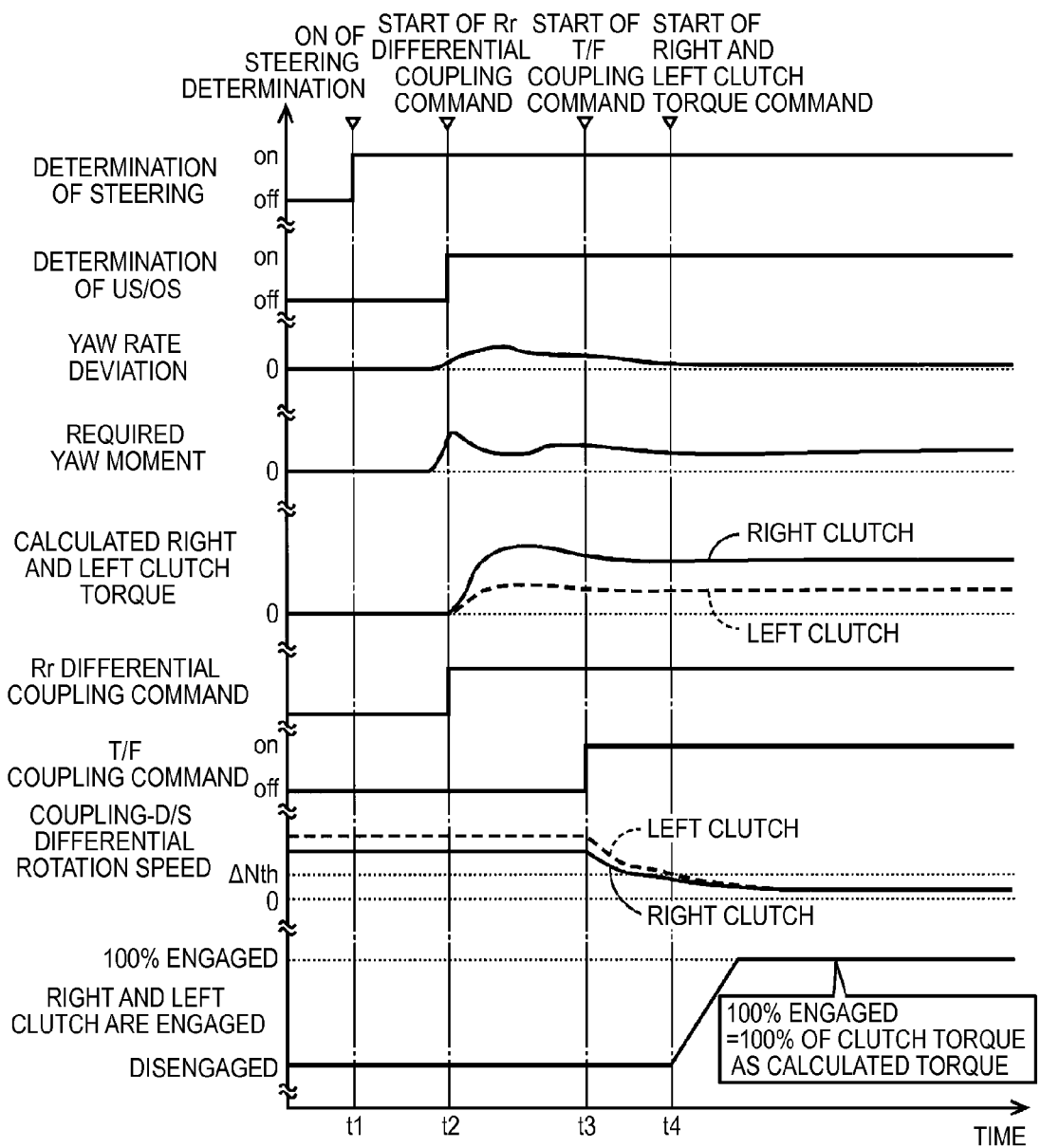
FIG. 4 is a timing chart illustrating an example where the control operation illustrated in the flowchart of FIG. 3 is performed.

FIG. 3 is a flowchart illustrating a principal part of the control operation, that is, the control operation for rapidly switching the running state to the 4WD running state at the time of switching from the 2WD_d running state to the 4WD running state (particularly, for appropriately suppressing the generated understeering or oversteering), of the electronic control unit 100, which is repeatedly performed, for example, in a very short cycle of about several msec to several tens of msec. FIG. 4 is a timing chart illustrating an example where the control operation illustrated in the flowchart of FIG. 3 is performed, where it is assumed that the understeering is generated at the time of steering for the left turn. The flowchart illustrated in FIG. 3 is started on the premise that it is determined by the vehicle running state determining unit 102 that the running state of the vehicle 10 should be set to the 4WD running state and thus the switching control from the 2WD_d running state to the 4WD running state is performed. The control operation illustrated in FIG. 3 is also a control operation for rapidly setting the drive wheels in the 4WD running state to the drive state corresponding to the vehicle running state.

In FIG. 3, first, in step (hereinafter, step is omitted) S10 corresponding to the vehicle running state determining unit 102, for example, it is determined whether the vehicle 10 of which the steering wheel 99 is operated is steered. When the determination result of S10 is positive (see time t1 in FIG. 4), for example, it is determined whether the vehicle 10 is in either of the understeering state or the oversteering state in S20 corresponding to the vehicle behavior determining unit 108. When the determination result of S20 is positive (see time t2 in FIG. 4), the required yaw moment Mreq is calculated on the basis of the yaw rate deviation ΔRyaw, for example, using the feedback control expression like Expression (4) in S30 corresponding to the required yaw moment computing unit 110. Subsequently, in S40 corresponding to the transmission torque computing unit 112, the left clutch torque Tcl in the first coupling 62 and the right clutch torque Tcr in the second coupling 64 are calculated on the basis of the required yaw moment Mreq and the like computed in S30, for example, using the operational expression like Expressions (10) and (11) (see the time subsequent to time t2 in FIG. 4). Subsequently, in S50 corresponding to the actuator output instructing unit 106, for example, the command for engaging the rear-side clutch 32 is output to the rear-side actuator 76 (see time t2 in FIG. 4). Subsequently, in S60 corresponding to the actuator output instructing unit 106, the command for engaging the front-side clutch 44 is output to the front-side actuator 46 (see time t3 in FIG. 4). Subsequently, in S70 corresponding to the vehicle running state determining unit 102, for example, it is determined whether the absolute value of the rotation speed difference between the rotation speed of the input gear 60 and the left-rear vehicle wheel speed Nwrl becomes equal to or less than the synchronization determination threshold value ΔNth and the absolute value of the rotation speed difference between the rotation speed of the input gear 60 and the right-rear vehicle wheel speed Nwrr becomes equal to or less than the synchronization determination threshold value ΔNth. S70 is repeatedly performed when the determination result of S70 is negative, but, for example, the command for generating the transmission torques in the first coupling 62 and the second coupling 64 are output to the corresponding electromagnetic solenoids so as to achieve the left clutch torque Tcl and the right clutch torque Tcr calculated in S40 (see the time subsequent to time t4 in FIG. 4) in S80 corresponding to the actuator output instructing unit 106 when the determination result of S70 is positive (see time t4 in FIG. 4). On the other hand, when either of the determination result of S10 or the determination result of S20 is negative, a normal 4WD switching control for switching the 2WD_d running state to the 4WD running state is performed, for example, in accordance with the above-mentioned normal 4WD switching control routine in S90 corresponding to the 4WD driving power computing unit 104 and the actuator output instructing unit 106. Through the 4WD switching control of S30 to S80, which is different from the normal 4WD switching control, it is possible to rapidly generate the required yaw moment Mreq for suppressing the understeering or oversteering using the driving power generated in the rear wheels 16R, 16L.

In FIG. 4, when the determination result of the steering is positive (time t1) and the determination result of the understeering state is positive (time t2), the engagement of the rear-side clutch 32 is started and the engagement of the front-side clutch 44 is started (time t3) after the rear-side clutch 32 is engaged. Thereafter, when the rotation speed difference (coupling-D/S differential rotation speed) between the rotation speed of the input gear 60 and the rotation speed of the rear-wheel axle 36 becomes equal to or less than the synchronization determination threshold value ΔNth (time t4), the first coupling 62 and the second coupling 64 are controlled so as to be engaged and the transmission torques are generated in the first coupling 62 and the second coupling 64 (the time subsequent to time t4) so as to achieve the left clutch torque Tcl and the right clutch torque Tcr necessary for obtaining the required yaw moment Mreq. Here, since the running state is the understeering state at the time of steering for a left turn, the right clutch torque Tcr is set to be larger than the left clutch torque Tcl so as to suppress the understeering state.

As described above, according to this embodiment, at the time of switching from the 2WD_d running state to the 4WD running state, after the front-side clutch 44 is controlled so as to be engaged without raising the propeller shaft rotation speed Np through the engagement of both of the first coupling 62 and the second coupling 64 (without decreasing the differential rotation speed of the front-side clutch 44) by controlling both of the first coupling 62 and the second coupling 64 so as to be engaged, the transmission torques are generated in both couplings of the first coupling 62 and the second coupling 64 on the basis of the vehicle running state. Accordingly, compared with a case where the 4WD switching control is performed in accordance with the normal 4WD switching control routine, it is possible to rapidly generate the transmission torques suitable for the vehicle running state in both of the first coupling 62 and the second coupling 64 at the initial time of the engagement of the first coupling 62 and the second coupling 64. Therefore, at the time of switching from the 2WD_d running state to the 4WD running state, the drive wheels 14, 16 in the 4WD running state can be rapidly switched to the driving state corresponding to the vehicle running state.

According to this embodiment, since the front-side clutch 44 is a frictional clutch, the rotation of the propeller shaft 28 in the 2WD_d running state is stopped. Accordingly, even when a certain amount of rotation speed difference occurs between the rotation speed on the propeller shaft 28 side of the front-side clutch 44 and the rotation speed on the engine 12 side of the front-side clutch 44 at the time of controlling the front-side clutch 44 so as to be engaged, it is possible to appropriately engage the front-side clutch 44.

According to this embodiment, when the steering is performed at the time of switching from the 2WD_d running state to the 4WD running state, the transmission torques are generated in both couplings of the first coupling 62 and the second coupling 64 on the basis of the vehicle running state after controlling the front-side clutch 44 so as to be engaged, thereby rapidly generating appropriate driving power in the drive wheels 14, 16. It is also possible to rapidly generate the yaw moment using the driving power generated in the rear wheels 16.

According to this embodiment, when the steering state is the understeering state or the oversteering state at the time of steering, the transmission torques are generated in both couplings of the first coupling 62 and the second coupling 64 on the basis of the vehicle running state after controlling the front-side clutch 44 so as to be engaged. Accordingly, it is also possible to rapidly generate the yaw moment for suppressing the generated understeering or oversteering using the driving power generated in the rear wheels 16.

According to this embodiment, when the steering is not performed at the time of switching from the 2WD_d running state to the 4WD running state, both couplings of the first coupling 62 and the second coupling 64 are controlled so as to be engaged, then the front-side clutch 44 is controlled so as to be engaged, and then the transmission torques are generated in both couplings of the first coupling 62 and the second coupling 64 on the basis of the vehicle running state. Accordingly, since both couplings of the first coupling 62 and the second coupling 64 are controlled so as to be engaged, it is possible to raise the rotation speed of the propeller shaft 28 of which the rotation is stopped so that the rotation speed on the propeller shaft 28 side of the front-side clutch 44 increases toward the rotation speed on the engine 12 side of the front-side clutch 44 and it is possible to engage the front-side clutch 44 in a state in which the differential rotation speed in the front-side clutch 44 is suppressed. After the front-side clutch 44 is engaged, appropriate driving power is generated in the drive wheels 14, 16.

Another embodiment of the invention will be described below. In the below description, elements common to the above-mentioned embodiment will be referenced by the same reference signs and description thereof will not be repeated.

Embodiment 2

In Embodiment 1, the front-side clutch 44 is a frictional clutch that selectively connects and disconnects the driven pinion 26 and the propeller shaft 28. The front-side clutch 44 is not limited thereto, but only has to be a frictional clutch that cuts off and sets up the power transmission path between the front differential 20 and the propeller shaft 28. As the connection-disconnection mechanism that is disposed on the engine 12 side of the propeller shaft 28 and that cuts off and sets up the power transmission path between the front differential 20 and the propeller shaft 28, a connection-disconnection mechanism other than the frictional clutch may be used instead of the front-side clutch 44. This different connection-disconnection mechanism is, for example, a dog clutch including a synchronization mechanism. An example where the dog clutch including the synchronization mechanism is employed will be described below.

Figure 5:
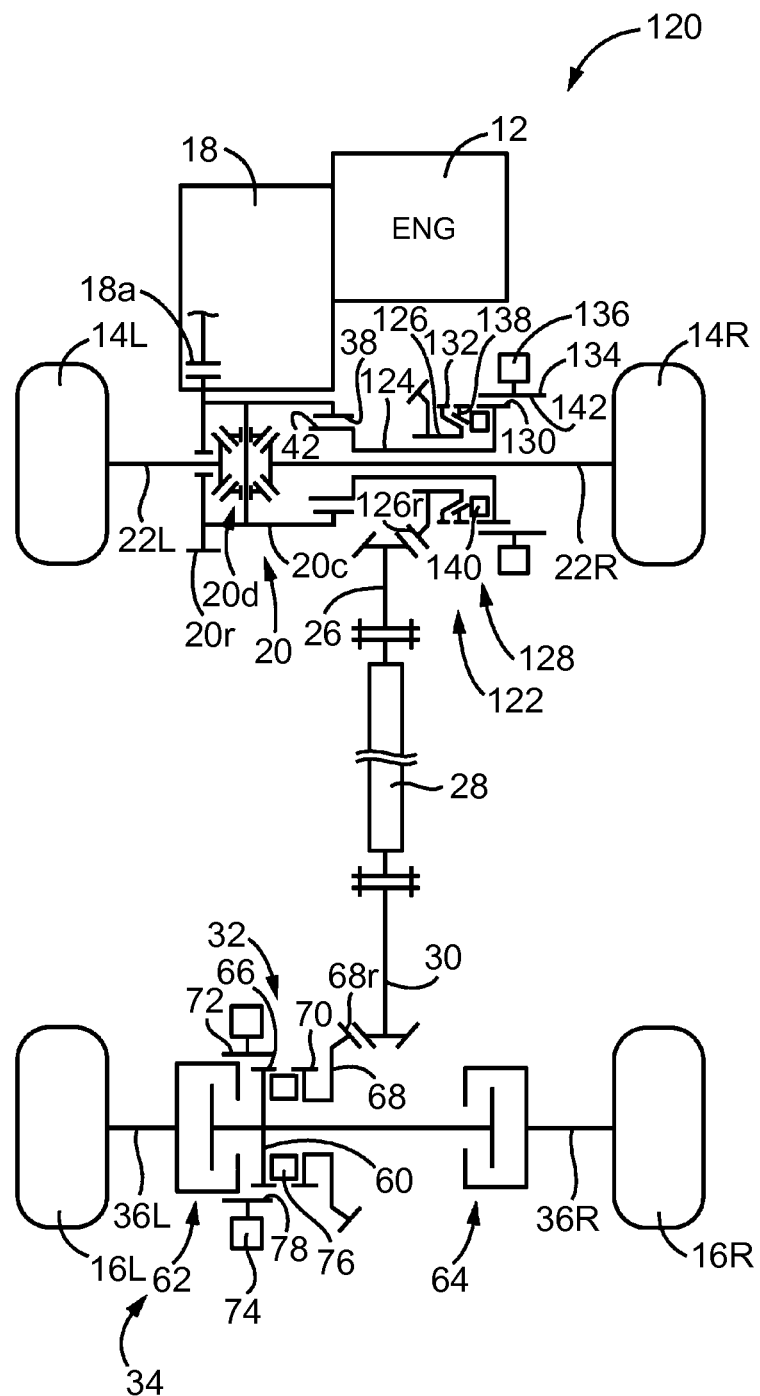
FIG. 5 is a skeletal diagram schematically illustrating a configuration of a four-wheel-drive vehicle to which the invention is applied and illustrates an embodiment other than the vehicle illustrated in FIG. 1.

FIG. 5 is a skeletal diagram schematically illustrating a configuration of a four-wheel-drive vehicle 120 (hereinafter, referred to as vehicle 120) to which the invention is applied and illustrates an embodiment other than the vehicle 10 illustrated in FIG. 1. In FIG. 5, the vehicle 120 includes a first power transmission path that is a power transmission path between the engine 12 and the front wheels 14 and that transmits dynamic power of the engine 12 to the front wheels 14 and a second power transmission path that is a power transmission path between the engine 12 and the rear wheels 16 and that transmits dynamic power of the engine 12 to the rear wheels 16. The second power transmission path includes the transmission 18, a transfer 122 as a front/rear-wheel power distribution device, a driven pinion 26, a propeller shaft 28 as a driving power transmission shaft, a driving pinion 30, a rear-side clutch 32, a right/left driving power distribution device 34, and rear-wheel axles 36. The transfer 122 is disposed in parallel to the front differential 20 and is connected to the front differential 20. The transfer 122 includes a first rotation member 124, a second rotation member 126, and a front-side clutch 128.

The first rotation member 124 has a substantially cylindrical shape and the front-wheel axle 22R passes through the inner circumference side thereof. The outer circumferential fitting teeth 42 are formed on one side in the axial direction of the first rotation member 124. The first rotation member 124 rotates together with the case 20c of the front differential 20 by fitting the outer circumferential fitting teeth 42 to the inner circumferential fitting teeth 38. Clutch teeth 130 constituting a part of the front-side clutch 128 are formed on the other side in the axial direction of the first rotation member 124.

The second rotation member 126 has a substantially cylindrical shape and the front-wheel axle 22R and the first rotation member 124 pass through the inner circumference side thereof. A ring gear 126r meshing with the driven pinion 26 so as to transmit power of the engine 12 to the rear wheels 16 side is formed on one side in the axial direction of the second rotation member 126. Clutch teeth 132 constituting a part of the front-side clutch 128 are formed on the other side in the axial direction of the second rotation member 126. The driven pinion 26 meshing with the ring gear 126r is connected to the propeller shaft 28 and is connected to the driving pinion 30 via the propeller shaft 28.

The front-side clutch 128 is a clutch that selectively connects and disconnects the first rotation member 124 and the second rotation member 126. The front-side clutch 128 is a dog clutch (that is, mesh type clutch) having a synchronization mechanism that includes the clutch teeth 130, the clutch teeth 132, a sleeve 134, a support member 136, a synchronizer ring 138 that prevents the sleeve 134 from moving to the second rotation member 126 when the rotations of the sleeve 134 and the second rotation member 126 are not synchronized with each other, and a front-side actuator 140. The sleeve 134 has a substantially cylindrical shape and inner circumferential teeth 142 that can mesh with the clutch teeth 130 and the clutch teeth 132 are formed on the inner circumference side of the sleeve 134. The sleeve 134 is moved in the axial direction, for example, by the front-side actuator 140 that can be electrically (electormagnetically) controlled by the electronic control unit 100. The synchronizer ring 138 is a synchronizer (synchronization mechanism) that synchronizes the inner circumferential teeth 142 of the sleeve 134 and the clutch teeth 132 when causing the teeth to mesh with each other.

FIG. 5 illustrates a state in which the front-side clutch 128 is disengaged. In this state, since the first rotation member 124 and the second rotation member 126 are disconnected, dynamic power of the engine 12 is not transmitted to the rear wheels 16. On the other hand, when the sleeve 134 moves and both of the clutch teeth 130 and the clutch teeth 132 mesh with the inner circumferential teeth 142, the front-side clutch 128 is engaged and the first rotation member 124 and the second rotation member 126 are connected to each other. Accordingly, when the first rotation member 124 rotates, the second rotation member 126, the driven pinion 26, the propeller shaft 28, and the driving pinion 30 rotate together. In this way, similarly to the front-side clutch 44, the front-side clutch 128 is a connection-disconnection mechanism that is disposed on the engine 12 side of the propeller shaft 28 and that cuts off or sets up a power transmission path between the front differential 20 and the propeller shaft 28. Similarly to the front-side clutch 44, the front-side clutch 128 is a disconnection mechanism that is disengaged during the 2WD running to stop the rotation of a predetermined rotation element for transmitting dynamic power to the rear wheels 16 during the 4WD running. Since the front-side clutch 128 is disposed closer to the engine 12 than to the second rotation member 126, the rotation of the second rotation member 126, the driven pinion 26, or the like is further stopped in the 2WD_d running of the vehicle 120 and the running resistance is further reduced, compared with the 2WD_d running of the vehicle 10.

Similarly to the vehicle 10, the vehicle 120 having the above-mentioned configuration includes an electronic control unit 100 and thus can perform the control operation for rapidly switching the drive wheels in the 4WD running state to the driving state corresponding to the vehicle running state at the time of switching from the 2WD_d running state to the 4WD running state as illustrated in the flowchart of FIG. 3.

As described above, according to this embodiment, the same advantages as described in Embodiment 1 are obtained. Since the front-side clutch 128 is a dog clutch including a synchronization mechanism, the rotation of the propeller shaft 28 in the 2WD_d running state is stopped. Accordingly, even when a certain amount of rotation speed difference occurs between the rotation speed on the propeller shaft 28 side of the front-side clutch 128 and the rotation speed on the engine 12 side of the front-side clutch 128 at the time of controlling the front-side clutch 128 so as to be engaged, it is possible to appropriately engage the front-side clutch 128.

While the embodiments of the invention have been described in detail with reference to the accompanying drawings, the invention may be modified in other aspects.

For example, in the above-mentioned embodiment, it is determined whether the vehicle is in either of the understeering state or the oversteering state. Such vehicle behavior is not limited to only the time in which the vehicle turns. For example, even when the steering wheel 99 is operated and thus the steering angle θsw is not zero, the vehicle 10 may run substantially straight, in which it is not determined that the vehicle 10 is turning, due to the generated understeering. Therefore, the condition for embodying Embodiment A in which the differential rotation speed of the front-side clutch 44 or 128 is not reduced by controlling both couplings of the first coupling 62 and the second coupling 64 so as to be engaged, the front-side clutch 44 or 128 is controlled so as to be engaged, and then the transmission torques are generated in both couplings of the first coupling 62 and the second coupling 64 is not limited to only the time in which the vehicle 10 is turning, but may occur during the time in which the vehicle 10 is steered. Even when the vehicle is not in either of the understeering state or the oversteering state at the time of steering, Embodiment A may be performed instead of the normal 4WD switching control routine. In this case, S20 in the flowchart illustrated in FIG. 3 may be skipped. Embodiment A may employ the normal 4WD switching control routine for switching from the 2WD_d running state to the 4WD running state. In this case, S10 in the flowchart illustrated in FIG. 3 may be skipped, and S30 to S80 in the flowchart illustrated in FIG. 3 are performed at the time of switching from the 2WD_d running state to the 4WD running state. In this case, S90 in the flowchart illustrated in FIG. 3 may be skipped.

In the above-mentioned embodiment, at the time of switching from the 2WD_d running state to the 4WD running state, the front-side clutch 44 is controlled so as to be engaged and then the transmission torques are generated in both couplings of the first coupling 62 and the second coupling 64 on the basis of the vehicle running state, but the invention is not limited to this example. For example, it may be considered that the transmission torque is generated in any one coupling of the first coupling 62 and the second coupling 64 depending on the left clutch torque Tcl and the right clutch torque Tcr calculated by the transmission torque computing unit 112. Accordingly, the invention is put into practice even when the transmission torque is generated in at least one of the first coupling 62 or the second coupling 64 on the basis of the vehicle running state. In this case, the transmission torque suitable for the vehicle running state is rapidly generated in the engaged coupling at the initial time of the engagement of at least one of the first coupling 62 or the second coupling 64. Therefore, it is possible to rapidly switch the running state to the 4WD running state corresponding to the vehicle running state at the time of switching from the 2WD_d running state to the 4WD running state. For example, it is also considered that the first coupling 62 and the second coupling 64 are rapidly completely engaged in a sand area or the like. In this case, it is not necessary to control the left clutch torque Tcl and the right clutch torque Tcr depending on the vehicle running state (for example, the steering angle θsw) but the couplings only have to be engaged as rapidly as possible. Accordingly, the invention is put into practice even when the transmission torque is generated in at least one coupling of the first coupling 62 and the second coupling 64 after the front-side clutch 44 is controlled so as to be engaged at the time of switching from the 2WD_d running state to the 4WD running state. In this case, the transmission torque can be rapidly generated in the engaged coupling at the initial time of the engagement of at least one of the first coupling 62 or the second coupling 64. Therefore, it is possible to rapidly switch the running state to the 4WD running state at the time of switching from the 2WD_d running state to the 4WD running state.

The flowchart of FIG. 3 in the above-mentioned embodiment is started on the premise that a switching control from the 2WD_d running state to the 4WD running state is performed, but is not limited thereto. In an aspect, for example, the switching from the 2WD_d running state to the 4WD running state may be determined on the condition that the determination results of S10 and S20 in the flowchart of FIG. 3 are both positive and S30 to S80 may be performed at the time of switching to the 4WD running state when this condition is satisfied. In this case, S90 in the flowchart illustrated in FIG. 3 may be skipped.

In the flowchart of FIG. 3 in the above-mentioned embodiment, S10, S20, or S90 may be skipped as described above, performing of S40 only has to be completed before performing S80, or the order of the steps or the like may be appropriately changed within an allowable scope.

As described in the above-mentioned embodiment, when the rear-side clutch 32 is engaged and the front-side clutch 44 or 128, the first coupling 62, and the second coupling 64 are disengaged, the vehicle 10 can be switched to the same state as the disconnected state. Therefore, even when the vehicle 10 does not include the rear-side clutch 32, the 2WD_d running state can be achieved. That is, the first coupling 62 and the second coupling 64 serve as the disconnection mechanism. Therefore, the invention can be applied to even the vehicle 10 not including the rear-side clutch 32. In the vehicle 10 not including the rear-side clutch 32, dragging of the wet multi-disc clutches constituting the couplings occur even when the first coupling 62 and the second coupling 64 are disengaged in the 2WD_d running state. Accordingly, there is a possibility that the rotation of a predetermined rotation element will not be completely stopped. The disconnection mechanism preferably is a mechanism that stops the rotation of the predetermined rotation element, but includes a mechanism that allows slight rotation due to the dragging or the like. The rear-side clutch 32 is useful in that the rotation due to the dragging or the like is prevented.

In the above-mentioned embodiment, the first coupling 62 and the second coupling 64 are electronically-controlled couplings, but are not limited thereto. For example, the first coupling 62 and the second coupling 64 may be a known hydraulic frictional engagement device.

In the above-mentioned embodiment, the rear-side clutch 32 and the front-side clutch 128 are electromagnetic dog clutches, but are not limited thereto. For example, the rear-side clutch 32 and the front-side clutch 128 may be a type of dog clutch which includes a shift fork for shifting a sleeve in the axial direction and in which the shift fork is driven by an actuator electrically or hydraulically controllable. The rear-side clutch 32 and the front-side clutch 44 or 128 must have a configuration capable of connecting and disconnecting rotation elements.

In the above-mentioned embodiment, the vehicle 10 has a structure in which dynamic power is normally transmitted to the front wheels 14 and the rear wheels 16 serve as the secondary drive wheels, but is not limited to this structure. For example, the vehicle 10 may have a structure in which dynamic power is normally transmitted to the rear wheels 16 and the front wheels 14 serve as the secondary drive wheels. For example, the vehicle 10 may be a FR-based four-wheel-drive vehicle.

In the above-mentioned embodiment, the required yaw moment computing unit 110 calculates the required yaw moment Mreq, for example, using the feedback control expression like Expression (4), but is not limited thereto. For example, a predetermined required yaw moment Mreq based on the yaw rate deviation ΔRyaw may be calculated by a feedforward control instead of the feedback control. In this case, as a result, the transmission torque generated in both of the first coupling 62 and the second coupling 64 after controlling the front-side clutch 44 or 128 so as to be engaged is a predetermined transmission torque based on the steering angle θsw. In this case, appropriate driving power is generated in the vehicle wheels 14, 16 even in a non-steered state in which the steering angle θsw is substantially zero. Particularly, at the time of steering, it is possible to generate the yaw moment based on the steering angle θsw using the driving power generated in the right and left rear wheels 16R, 16L. The feedback control and the feedforward control may be combined.

The above-mentioned embodiment is only an example and the invention can be modified in various aspects by those skilled in the art.

What is claimed is:

1. A control system for a four-wheel-drive vehicle including a driving power source, primary drive wheels, secondary drive wheels, and a rotation member, the control system comprising:
    a transfer connected to the rotation member constituting a part of a first power transmission path between the driving power source and the primary driving wheels, the transfer configured to distribute dynamic power of the driving power source to the secondary drive wheels;
    a driving power transmission shaft configured to transmit the dynamic power of the driving power source distributed by the transfer to the secondary drive wheels;
    a connection-disconnection mechanism disposed on a driving power source side of the driving power transmission shaft, the connection-disconnection mechanism configured to cut off and establish a second power transmission path between the rotation member and the driving power transmission shaft;
    a first clutch disposed in a third power transmission path between the driving power transmission shaft and a left wheel of the secondary drive wheels, the first clutch configured to change a transmission torque;
    a second clutch disposed in a fourth power transmission path between the driving power transmission shaft and a right wheel of the secondary drive wheels, the second clutch configured to change a transmission torque;
    an electronic control unit configured to:
    switch, on the basis of a vehicle running state, between a two-wheel-drive running state in which the connection-disconnection mechanism, the first clutch, and the second clutch are disengaged and a four-wheel-drive running state in which the connection-disconnection mechanism, the first clutch, and the second clutch are engaged;
    determine, when switching from the two-wheel-drive running state to the four-wheel-drive running state and at a time of steering when a driver operates a steering wheel so as to turn the four-wheel drive vehicle, whether a steering state is an understeering state or an oversteering state;
    when the steering state is the understeering state or the oversteering state, control the connection-disconnection mechanism to engage the connection-disconnection mechanism before controlling the first clutch and the second clutch, and generate a transmission torque in the first clutch and the second clutch so as to achieve a torque distribution to the left and right wheels of the secondary drive wheels required to obtain a yaw moment that suppresses the determined understeering state or oversteering state, after controlling the connection-disconnection mechanism to engage the connection-disconnection mechanism; and
    control, when the steering state is neither the understeering state nor the oversteering state, the connection-disconnecting mechanism to engage the connection-disconnection mechanism after controlling the first clutch and the second clutch to engage both the first clutch and the second clutch.

2. The control system according to claim 1, wherein the connection-disconnection mechanism is a frictional clutch or a dog clutch including a synchronization mechanism.

3. The control system according to claim 1, wherein the electronic control unit is configured, when switching from the two-wheel-drive running state to the four-wheel-drive running state and at a time of non-steering, to control the connection-disconnection mechanism to engage the connection-disconnection mechanism after controlling the first clutch and the second clutch to engage both of the first clutch and the second clutch, and to generate the transmission torque in both the first clutch and the second clutch on the basis of the vehicle running state after controlling the connection-disconnection mechanism to engage the connection-disconnection mechanism.

4. The control system according to claim 3, wherein the connection-disconnection mechanism is a frictional clutch or a dog clutch including a synchronization mechanism.

* * * * *

UNITED STATES PATENT AND TRADEMARK OFFICE
CERTIFICATE OF CORRECTION

PATENT NO.        : 9,598,068 B2                                       Page 1 of 1
APPLICATION NO.   : 14/515786
DATED             : March 21, 2017
INVENTOR(S)       : Yoshinori Maeda, Kunihiro Iwatsuki and Hiroyuki Ishii It is certified that error appears in the above-identified patent and that said Letters Patent is hereby corrected as shown below:

In the Specification
In Column 14, Line 38, after "angle" delete "δswth2", and insert --θswth2--, therefor.
In Column 14, Line 41, delete "δswth2", and insert --θswth2--, therefor.
In Column 14, Line 45, delete "δswth2", and insert --θswth2--, therefor.

Signed and Sealed this
Sixteenth Day of May, 2017

Michelle K. Lee
*Director of the United States Patent and Trademark Office*